J. P. HARPER & A. W. KRUPP.
EGG CARRIER.
APPLICATION FILED OCT. 14, 1913.
1,125,313. Patented Jan. 19, 1915.
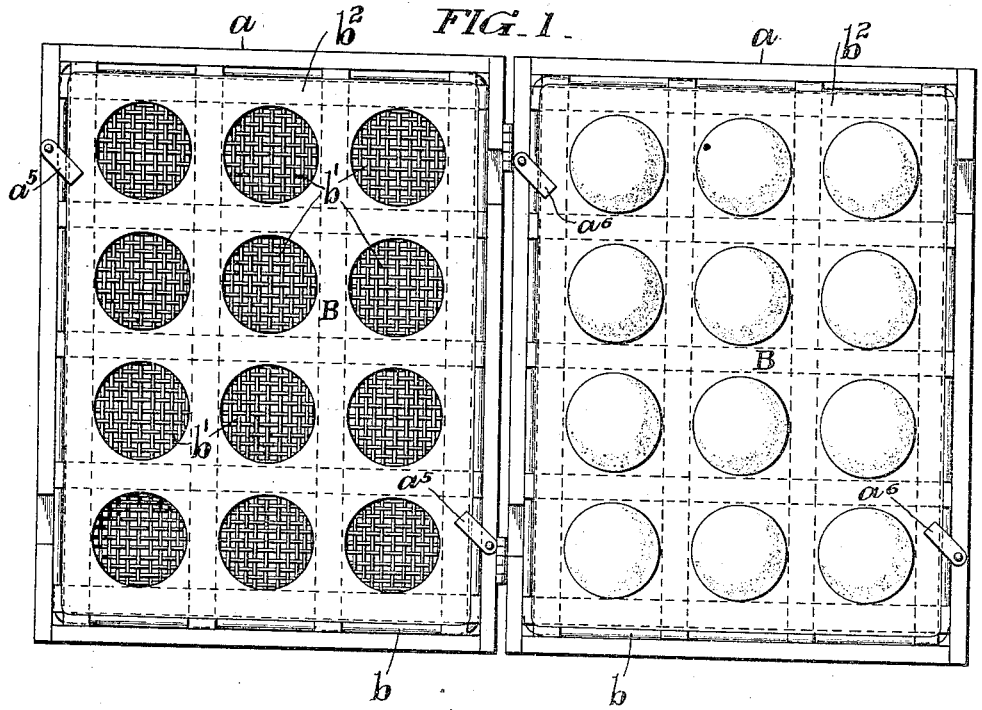
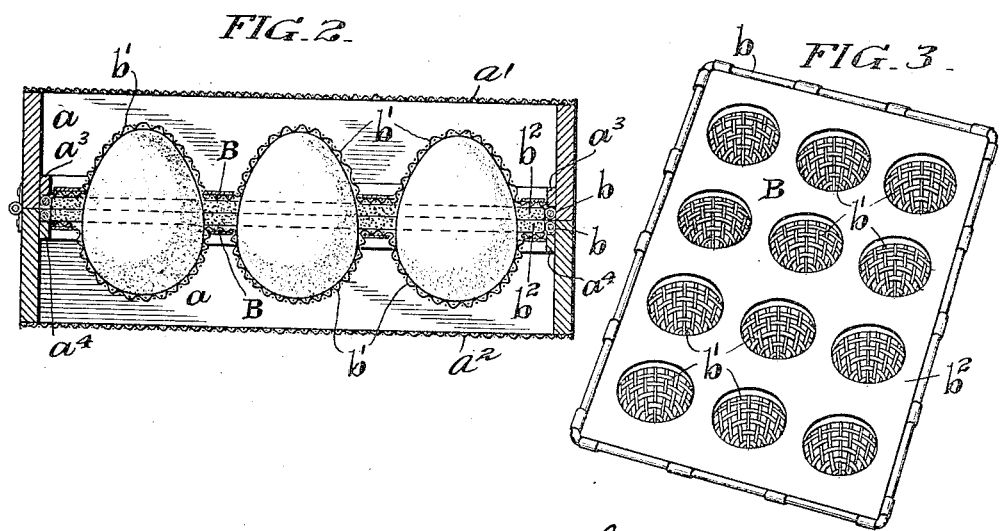
WITNESSES
Thomas M. Smith
Helen S. Holt
INVENTORS
John P. Harper and Alvam W. Krupp
BY
J. Walter Douglass
ATTORNEY

UNITED STATES PATENT OFFICE.

JOHN P. HARPER AND ABRAM W. KRUPP, OF PHILADELPHIA, PENNSYLVANIA.

EGG-CARRIER.

1,125,313. Specification of Letters Patent. Patented Jan. 19, 1915.

Application filed October 14, 1913. Serial No. 795,050.

*To all whom it may concern:*

Be it known that we, JOHN P. HARPER and ABRAM W. KRUPP, both citizens of the United States, and residing in the city of Philadelphia, in the county of Philadelphia and State of Pennsylvania, have jointly invented certain new and useful Improvements in Egg-Carriers, of which the following is a specification.

Our invention has relation to a protected sanitary carrier for parcel post shipping of eggs or other similar articles; and in such connection it relates to the particular structural arrangement of the same, for the defined purpose.

Our invention consists of a folding sanitary carrier for eggs or similar articles having a wire netting on both ends of the carrier and on the interior provided with pockets arranged in series and composed of open mesh fibrous material surrounded with a felt or like material mat having openings registering with the top of said pockets to cushion the bodies of the eggs in the pockets of the carrier while the ends of the eggs are protected by the open mesh fibrous material of the pockets in position remote from the wire nettings of the ends of the said carrier in its folded relationship.

The nature and scope of our present invention will be more fully understood from the following description taken in connection with the accompanying drawings forming part hereof, in which—

Figure 1, is a top or plan view of the two halves of the egg shipping carrier, in one of which is shown a dozen eggs in position for the infolding of the other half of the carrier onto the eggs of the said carrier; and this view embodying the main features of our said invention. Fig. 2, is a transverse sectional view of the carrier in a folded condition; and Fig. 3, is a perspective of one of the egg holders removed from its housing to show the detail arrangement of the same.

Referring to the drawings, as illustrated in Fig. 1, $a$, is the carrier frames consisting of two rectangular sections provided with mesh wire ends $a^1$ and $a^2$. The opposite ends adjacent to the edges being provided with rims $a^3$ and $a^4$, and above the said rims are arranged movable clamps or cleats $a^5$ and $a^6$, at suitable distances apart for a purpose to be presently explained. Each half of the carrier is provided with an egg holder B, consisting of a wire framing $b$, having suspended therefrom a series of fibrous open mesh material pockets $b^1$, arranged side by side in rows and these pockets have fitted around and about the same a perforated felt or like material mat $b^2$. The mat $b^2$, is preferably stamped out of a single piece of felt or similar material and having the perforations of the same arranged to register with the pockets of the holder. The felt openings registering with each other, when the two halves of the carrier $a$, are folded together, as illustrated in Fig. 2, protect the bodies of the eggs and thus avoid possible breakage in carriage or shipment. The pockets being of soft mesh fibrous material hold the eggs in an upright position remote from the end wire netting of the carrier incasing the same, yet insuring the maintenance of the same in a sanitary condition while effectively screening the eggs against breakage in carriage or shipment by parcel post or express. The two sections of the framing $b$, of the carrier $a$, rest on the rims $a^3$ and $a^4$, of the respective halves of the said carrier, as clearly shown in Fig. 2. The movable catches $a^5$ and $a^6$, Fig. 1, when shifted fasten each framing $b$, to position in the two part carrier during folding of one member onto the other and also while in such condition, as clearly shown in Fig. 2. The defined carrier is constructively arranged so that the egg-shaped or other similar articles may be held in a vertical depending safe position for the security of the articles against breakage in their shipment or in the reversal of the carrier. Then such a carrier as described is susceptible of being used over and over again for similar purposes.

Having thus described the nature and objects of our invention, what we claim as new and desire to secure by Letters Patent is:—

A sectional sanitary carrier having ends covered with netting and a holder removably mounted in each section of the carrier and consisting of a framing provided with a perforated mat of felt and the openings of the mat registering with depending pockets of fibrous material to support vertically articles therein and said sections folding onto each other, substantially as and for the purposes described.

In witness whereof, we have hereunto set our signatures in the presence of the two subscribing witnesses.

JOHN P. HARPER.
ABRAM W. KRUPP.

Witnesses:
HELEN S. HOLT,
THOMAS M. SMITH.